(12) United States Patent
Flores Tapia et al.

(10) Patent No.: US 10,845,478 B2
(45) Date of Patent: Nov. 24, 2020

(54) MICRO-DOPPLER APPARATUS AND METHOD FOR TRAILER DETECTION AND TRACKING

(71) Applicant: GM GLOBAL TECHNOLOGY OPERATIONS LLC, Detroit, MI (US)

(72) Inventors: Daniel Flores Tapia, Auburn Hills, MI (US); Jeremy P. Gray, Clarkston, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 245 days.

(21) Appl. No.: 16/124,569

(22) Filed: Sep. 7, 2018

(65) Prior Publication Data

US 2020/0081117 A1     Mar. 12, 2020

(51) Int. Cl.
*G01S 13/931* (2020.01)
*G01S 13/58* (2006.01)
*G01S 7/292* (2006.01)

(52) U.S. Cl.
CPC ............ *G01S 13/931* (2013.01); *G01S 7/292* (2013.01); *G01S 13/581* (2013.01); *G01S 2013/93185* (2020.01); *G01S 2013/93272* (2020.01)

(58) Field of Classification Search
CPC combination set(s) only.
See application file for complete search history.

(56) References Cited

U.S. PATENT DOCUMENTS

| | | | |
|---|---|---|---|
| 2007/0182528 A1* | 8/2007 | Breed | B60Q 9/008 340/435 |
| 2014/0218227 A1* | 8/2014 | Stelzen | G01S 17/88 342/104 |
| 2016/0009284 A1* | 1/2016 | Tokimasa | G01S 13/931 701/96 |
| 2016/0153778 A1* | 6/2016 | Singh | G01B 21/08 701/36 |
| 2016/0229402 A1* | 8/2016 | Morita | G08G 1/096758 |
| 2017/0124881 A1* | 5/2017 | Whitehead | B60Q 9/008 |
| 2017/0363736 A1* | 12/2017 | Kaino | G01S 13/32 |
| 2018/0011172 A1* | 1/2018 | Cashler | G01S 13/72 |
| 2019/0170867 A1* | 6/2019 | Wang | G01S 7/411 |
| 2019/0179010 A1* | 6/2019 | Nasser | G01S 13/931 |
| 2019/0308473 A1* | 10/2019 | Yu | B60D 1/363 |
| 2019/0335100 A1* | 10/2019 | Chen | B60R 1/00 |
| 2020/0039483 A1* | 2/2020 | Nemeth | G08G 1/167 |

* cited by examiner

*Primary Examiner* — Mamadou L Diallo
(74) *Attorney, Agent, or Firm* — Lorenz & Kopf, LLP

(57) ABSTRACT

The present application generally relates to a method and apparatus for application trailering in a motor vehicle. In particular, the system is operative to determine a trailer type and handling characteristic of a trailer in response to a micro-Doppler signature of the trailer.

19 Claims, 4 Drawing Sheets

100

200

MICRO-DOPPLER APPARATUS AND METHOD FOR TRAILER DETECTION AND TRACKING

BACKGROUND

The present disclosure relates generally to a vehicle trailer detection and monitoring system. More specifically, aspects of the present disclosure relate to systems, methods and devices for utilizing a micro-Doppler signature from a vehicle mounted narrowband radar in order to detect trailer location, handling characteristics and relative motion.

Autonomous vehicles are configured with numerous sensors to detect their environment and surroundings. This is important as the vehicle must navigation within this environment while avoiding all obstacles. However, it is generally an assumption that the size of the vehicle and the location of the sensors remain fixed. When a trailer is attached to the vehicle, the size and handling dynamics of the vehicle change and this may adversely affect the performance of the autonomous driving algorithm.

As driving assist systems increase their degree of autonomy, more complex use cases need to be addressed, such as the addition of trailers to the vehicle. For example, a vehicle user may desire to attach a low profile trailer to the vehicle operating in autonomous mode. It is desirable for the vehicle control system to detect the trailer and estimate the parameters, such as size and weight to optimize performance of the algorithm. Although several approaches based on the use of optical or radar sensor information have been proposed for this problem, these methods usually are not cost efficient as high sensor accuracy and complex algorithms are needed to deal with the low information content of the trailer responses compared to the background clutter. It would be desirable to overcome these problems and enable the autonomous system to determine the required trailer information for autonomous control.

The above information disclosed in this background section is only for enhancement of understanding of the background of the invention and therefore it may contain information that does not form the prior art that is already known in this country to a person of ordinary skill in the art.

SUMMARY

Disclosed herein are vehicle braking methods and systems and related control logic for provisioning vehicle braking control systems, methods for making and methods for operating such systems, and motor vehicles equipped with onboard control systems. By way of example, and not limitation, there is presented various embodiments of a parking brake assist module, and a method for detecting a potential assist condition and engaging a parking brake assist in response to the detection are disclosed herein.

In accordance with an aspect of the present invention a method of controlling a vehicle comprising receiving a data signal indicating a trailering condition, transmitting an electromagnetic pulse in a direction of a trailer, receiving a reflected electromagnetic pulse, reflected from the trailer, determining a micro-Doppler signature in response to the reflected electromagnetic pulse, determining a trailer characteristic in response to a comparison of the micro-Doppler signature to a stored trailer micro-Doppler signature, and generating a control signal for controlling a vehicle in response to the trailer characteristic.

In accordance with another aspect of the present invention an apparatus comprising a transceiver for transmitting an electromagnetic pulse and for receiving a reflection of the electromagnetic pulse, a filter for extracting a micro-Doppler characteristic from the reflection of the electromagnetic pulse, a memory for storing a trailer characteristic, a processor for comparing the micro-Doppler characteristic to the trailer characteristic, the processor being further operative to generate a control signal in response to the micro-Doppler characteristic corresponding to the trailer characteristic, and a controller for controlling a vehicle in response to the control signal.

In accordance with another aspect of the present invention a method of controlling a vehicle comprising transmitting a radar pulse, receiving a reflection of the radar pulse, determining a micro-Doppler characteristic in response to the reflection of the radar pulse, determining a trailer type in response to the micro-Doppler characteristic and a stored trailer characteristic, and generating a control signal for input to a vehicle control system in response to the trailer type.

The above advantage and other advantages and features of the present disclosure will be apparent from the following detailed description of the preferred embodiments when taken in connection with the accompanying drawings.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Figure 1:
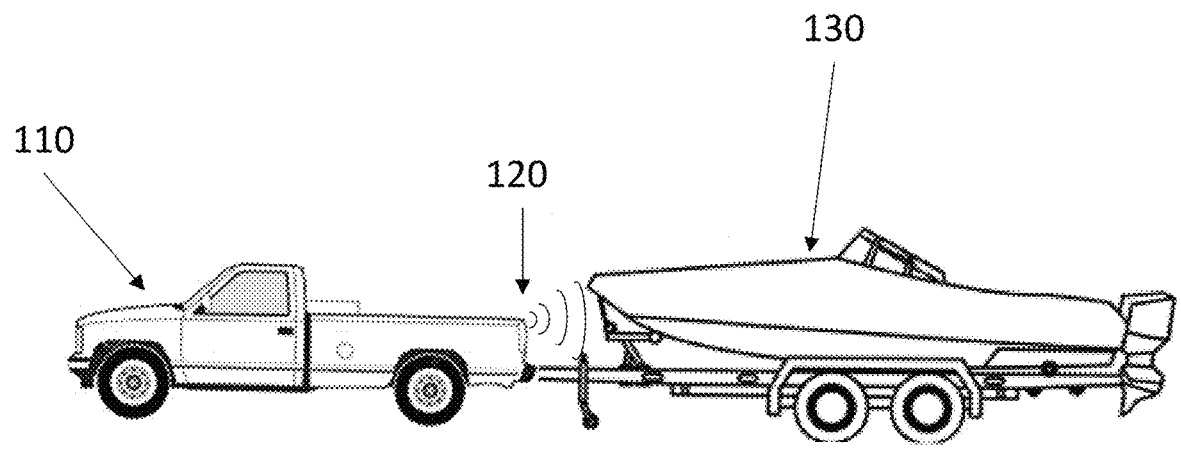
FIG. 1 schematically illustrates an exemplary application of the method and apparatus for trailer detection and tracking in a motor vehicle according to an exemplary embodiment.
Figure 1:
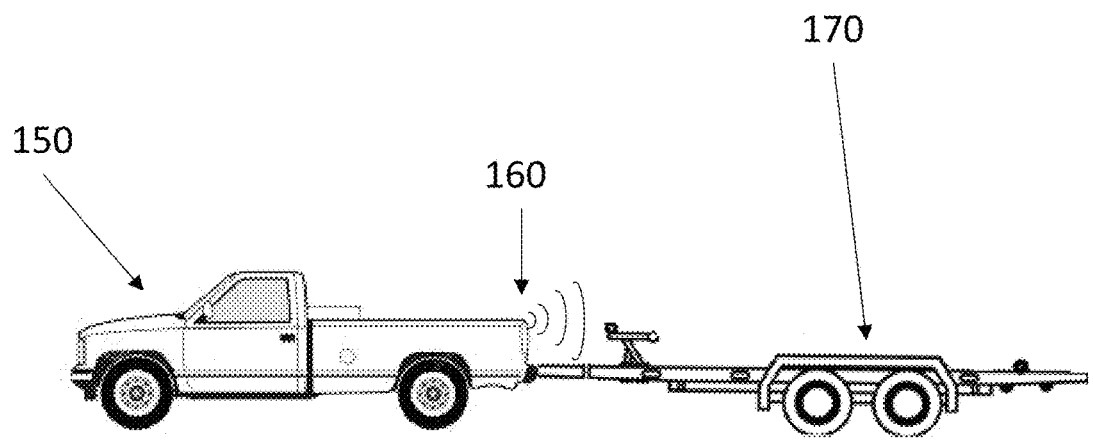

The exemplifications set out herein illustrate preferred embodiments of the invention, and such exemplifications are not to be construed as limiting the scope of the invention in any manner.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" rifer to directions in the drawings to which reference is made. Terms such as "front." "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

Typically, radar transmits an electromagnetic signal at a known carrier frequency. When the electromagnetic signal is reflected from an object of interested and the object is moving at a constant velocity, the reflected frequency is shifted from the carrier frequency by an amount proportional to the velocity. This is known as the Doppler effect. If the object has a mechanical vibration or rotation in addition to the velocity, sideband frequencies may be generated around the reflected frequency called micro-Doppler characteristics. Micro-Doppler characteristics may be used to determine some dynamic properties of the object and the micro-Doppler signature may be used to identify an object or type of object.

The presently disclosure teaches a method and system for tracking of a wide variety of trailers using their micro-Doppler signature. This method and system use an array narrow band, narrow beamwidth antenna and a coherent radar processing chain to sense the responses from the trailer structure. The responses are then processed to extract the micro-Doppler information and use it to extract the trailer location and motion relative to the vehicle. This facilitates detecting and tracking a wider variety of trailers, including low profile trailers at a lower cost, due to the nature of the antennas and RF signal processing chain.

The disclosed system and method use a set of these micro-Doppler radar signal features in order detect and characterize a wide variety of targets using a low cost sensor and computationally efficient algorithms. By using micro-Doppler two main issues with current trailer detection systems may be resolved. First, the trailer and background responses can be effectively separated as they have different vibration patterns. In addition, the cost of the sensor device is lowered, as the antenna and RF front end used in the system have a low bandwidth and narrow beamwidth.

After the trailer is attached to the vehicle, a set of several micro-Doppler tracking sensors start irradiating an electromagnetic waveform and collecting the responses from targets behind the vehicle. The recorded signals are recorded and processed to extract the micro-Doppler information. An adaptive filter is used to discriminate the responses from stationary/low vibrating objects (road clutter, traffic signs) from the trailer responses. The magnitude of the trailer micro-Doppler signature at each sensor is then transmitted to the driving assist system for interpretation and use. Calculation of micro-Doppler is made in both in the range and azimuth directions. Segmentation of the micro-Doppler spectrum to separate different vibrational patterns. Registration of 2D micro-Doppler data with beamformed data for spatially localized vibrational characterization of radar returns. Use of micro-Doppler for CFAR and tracking filter tolerance adjustments. Use of a self-adapting schema in the form of support vector machines for 2D vibrational pattern separation.

FIG. 1 schematically illustrates an exemplary application of the method and apparatus for trailer detection and tracking in a motor vehicle 100 according to the present disclosure. In this exemplary embodiment, a first vehicle 110 is equipped with a first trailer 130 having a first set of towing and performance characteristics. In this exemplary embodiment, the first vehicle 110 is operative to emit an electromagnetic signal 120 in order to determine the micro-Doppler characteristics of the first trailer 130. In a second exemplary embodiment, a second vehicle 150 is equipped with a second trailer 160 having a second set of towing and performance characteristics. The second vehicle is also equipped to emit an electromagnetic signal 160 in order to determine the micro-Doppler characteristics of the second trailer 160.

The first trailer 130 and the second trailer 160 of the first and second embodiments will have very different handling characteristics which must be considered for an autonomous vehicle towing the trailers. For example, the first trailer 130 carrying the boat will be significantly heavier and therefore may result in trailer sway, snaking, and wobbling. The second trailer 160, which in this exemplary embodiment is unloaded, will be significantly lighter but may bounce over uneven road surfaces either dislodging the second trailer 160 or affecting the handling of the second vehicle 150. It would be desirable to be able to identify the trailer and load of the trailer during vehicle operation such that an autonomous vehicle control system may account for these characteristics during operation.

Figure 2:
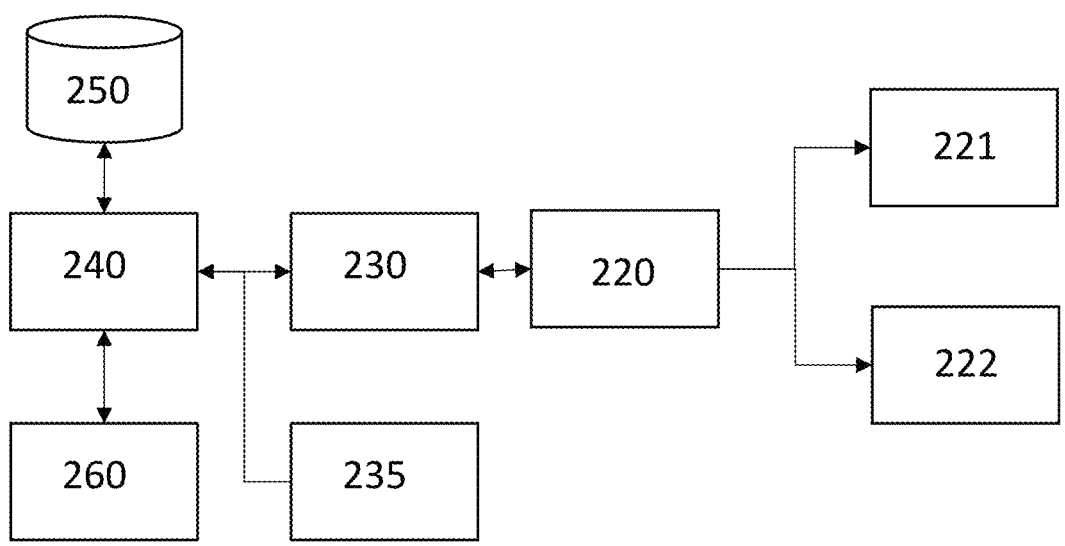
FIG. 2 shows a block diagram illustrating an exemplary system for trailer detection and tracking in a motor vehicle according to an exemplary embodiment.

Turning now to FIG. 2, a block diagram illustrating an exemplary system for trailer detection and tracking in a motor vehicle 200 is shown. The exemplary system may have a first radar sensor 221 and a second radar sensor 222. The reflected radar signals from a single or multiple transmitters are received at the first radar sensor 221 and the second radar sensor 222 wherein the reflected radars signals include a frequency representing an object of interest velocity and a plurality of signals representing a micro-Doppler response of the object of interest. In this exemplary embodiment, the object of interest is a trailer attached to a vehicle.

The received reflected radar signals are coupled to an adaptive filter 220 for discriminate the signals representing the object of interest from other stationary or low vibrating objects, such as road clutter and traffic signs. The filtered signals are then coupled to a radar processor 230 for determination of the magnitude of the trailer micro-Doppler signature at each radar sensor. Calculation of micro-Doppler is made in both in the range and azimuth directions. A segmentation of the micro-Doppler spectrum is made to separate different vibrational patterns. The radar processor 230 is then operative for registration of 2D micro-Doppler data with beamformed data for spatially localized vibrational characterization of radar returns. In this exemplary embodiment, micro-Doppler may be used for constant false alarm rate (CFAR) detection and tracking filter tolerance adjustments. The exemplary system may be further used us as a self-adapting schema in the form of support vector machines for 2D vibrational pattern separation. The micro-Doppler signatures are then coupled to a driving assist processor 230 for interpretation and use in identifying trailer characteristics.

The driving assist processor 230 is operative to receive the micro-Doppler signatures from the radar processor 230 and to compare these signatures to known signatures stored on a memory 250. In response to the comparison, the driving assist processor 230 determines a trailer with a micro-Doppler signature closely matching that of the received micro-Doppler signatures. The driving assist processor 230 may further receive input from a trailer detection system 235. The trailer detection system 235 is a sensor or the like operative to detect if a vehicle has a trailer attached. This may be accomplished by an active sensor, such as a trailer electrical plug detector or trailer communications device, a load sensor on the trailer hitch, a rear facing camera, lidar, radar, IR detector or the like. The trailer detection system 235 may transmit a signal indicating a trailer connection status, or may respond to a poll from the vehicle control system or the controller 240. In addition, the trailer detection system 235 may indicate tongue weight and other trailer parameters in real time and couple this information to the driving assist processor 230. The driving assist processor 230 is then operative to determine an appropriate control algorithm in response to the trailer determination and any trailer detection data and couple this control algorithm to a vehicle control system 235. Examples of vehicle control systems may include motor controls, transmission controls, braking and steering.

Figure 3:
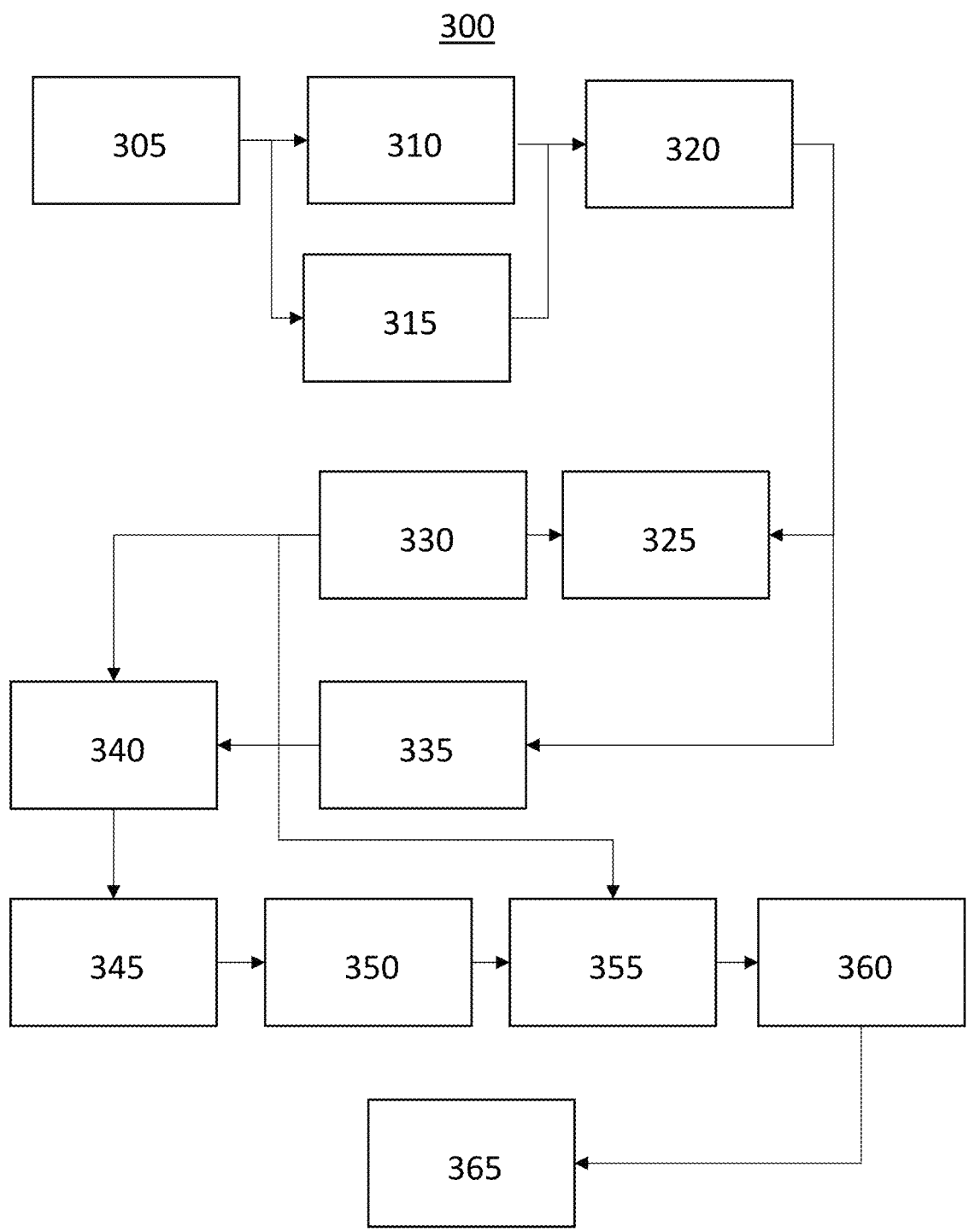
FIG. 3 shows a flowchart illustrating an exemplary method for trailer detection and tracking in a motor vehicle according to an exemplary embodiment.

Turning now to FIG. 3, a flowchart illustrating an exemplary method for trailer detection and tracking in a motor vehicle 300 is shown. The method is first operative to receive the raw complex data 305. This raw data may be received from the first radar sensor 221 and/or the second radar sensor of FIG. 2. The method is then operative to perform an azimuth fast Fourier transform (FFT) 310 on the raw data to transform the data into the Doppler domain. The FFT may be performed in the azimuth direction on each range gate where the FFTs are performed on blocks of data overlapped by the azimuth matched filter length. In parallel, a two dimensional micro-Doppler spectrum calculation is performed 315 on the raw data in order to generate a micro-Doppler signature for an object within the field of view of the radar sensors.

A support vector machine (SVM) discriminate application is then performed 320 in response to the Doppler domain data and the micro-Doppler signature to generate signal categories. An SVM is a machine learning supervised learning model used to analyze data for classification and regression analysis. The SVM discriminate application assigns data is operative to assign the incoming data into separate probabilistic classifications or categories. A micro-Doppler spectrum region of interest (ROI) segmentation is then performed on the SVM generated signal categories 325. A calculation of the ROI micro-Doppler vibrational patterns is then made for each ROI segmentation 330. In addition, a spectrum ROI calculation is performed on the SVM generated signal categories 335. A coherent beamforming operation 340 in the frequency domain is then performed on the results of the spectrum ROI calculations and the calculated ROI micro-Doppler vibrational patterns. Beamforming is a signal processing technique of spatial filtering wherein the received signal data experience constructive interference and destructive interference in order to achieve spatial selectivity. Adaptive beamforming may be used to detect and estimate the signal of interest from a plurality of radar sensors using spatial filtering and interference rejection.

The results of the coherent beamforming operation are then applied to a constant false alarm rate (CFAR) detector 345 in order to detect objects of interest against background noise, clutter and interference. The CFAR detector results are then applied to a target location extractor 350. A tracking filter operation 355 is then applied to the results of the target location extractor and the ROI micro-Doppler vibrational patterns. The results of the tracking filter operation 355 are then applied to a cognitive engine 360. The output of the cognitive engine is a list of objects of interest determined by the radar system. The cognitive engine will determine that an object of interest is a trailer in response to the micro-Doppler vibrational pattern associated with the trailer. This list of objects of interest are then coupled to the vehicle driving assist processor 365 for use in control of the vehicle. The driving assist processor is operative to compare the list of objects and associated information to a list of know trailer patterns and to determine a set of trailer characteristics similar to the listed trailer. The driving assist processor is then operative to control the vehicle in response to the determine set of characteristics for optimal performance and safety.

Figure 4:
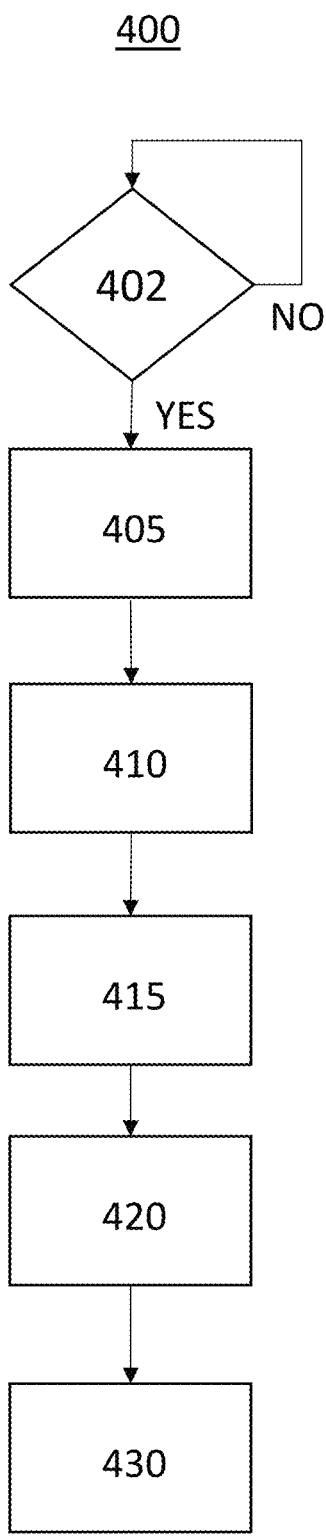
FIG. 4 shows a flowchart illustrating an exemplary method for trailer detection and tracking in a motor vehicle according to another exemplary embodiment.

Turning now to FIG. 4, a flowchart illustrating another exemplary method for trailer detection and tracking in a motor vehicle 400 is shown. A method of controlling a vehicle comprising receiving a data signal indicating a trailering condition 402. The data signal may be generated by a trailer connector, a sensor in a trailer hitch, a user interface in a vehicle cabin or the like. The data signal is indicative of a trailer being attached to the vehicle. Transmitting an electromagnetic pulse in a direction of a trailer 405. The electromagnetic pulse may be a radar pulse transmitted by one or more radar transmitters at a known frequency and duration. Receiving a reflected electromagnetic pulse, reflected from the trailer 410. The reflected electromagnetic pulse may include a first signal component indicative of a radial velocity and a second signal component indicative of a micro-Doppler signature. For a trailer being towed by a vehicle the relative velocity between the trailer and the vehicle is zero and therefore the radial velocity of a trailer would have a zero magnitude. The method is then operative to determine a micro-Doppler signature in response to the reflected electromagnetic pulse 415. The method then compares the micro-Doppler signature to a database of know trailer micro-Doppler signatures and determines a a trailer characteristic in response to a comparison of the micro-Doppler signature to the stored trailer micro-Doppler signature 420. Generating a control signal for controlling a vehicle in response to the trailer characteristic 430. The control signal will be indicative of an estimated trailer size, weight, and handling characteristics for use by a vehicle control system in controlling a vehicle with the trailer attached. The vehicle may be an autonomous vehicle and must therefore control the operation of the vehicle in response to the presence and handling characteristics of the trailer.

The method may further be operative to receiving a sensor signal indicating the presence of a trailer and wherein the micro-Doppler signature is determined in response to the sensor signal and the reflected electromagnetic pulse. The trailer characteristic may be indicative of a size and weight of a trailer. The method may further comprising filtering the reflected electromagnetic pulse in response to a frequency of the electromagnetic pulse to extract a micro-Doppler signal and wherein the micro-Doppler signature is determined in response to the micro-Doppler signal. The reflected electromagnetic pulse may comprise a frequency indicative of a radial velocity and wherein the data signal is generated in response to the radial velocity having a zero magnitude.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might" "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a" "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 5," "1 to 3," "2 to 4," "3 to 5," etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components. Such example devices may be on-board as part of a vehicle computing system or be located off-board and conduct remote communication with devices on one or more vehicles.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method of controlling a vehicle comprising:
receiving a data signal indicating a trailering condition;
transmitting an electromagnetic pulse in a direction of a trailer;
receiving a reflected electromagnetic pulse reflected from the trailer;
determining a micro-Doppler signature in response to the reflected electromagnetic pulse;
determining a trailer characteristic in response to a comparison of the micro-Doppler signature to a stored trailer micro-Doppler signature; and
generating a control signal for controlling a vehicle in response to the trailer characteristic.

2. The method of claim 1 further comprising receiving a sensor signal indicating the presence of a trailer and wherein the micro-Doppler signature is determined in response to the sensor signal and the reflected electromagnetic pulse.

3. The method of claim 1 wherein the trailer characteristic is indicative of a size and weight of a trailer.

4. The method of claim 1 wherein the vehicle is an autonomous vehicle.

5. The method of claim 1 further comprising filtering the reflected electromagnetic pulse in response to a frequency of the electromagnetic pulse to extract a micro-Doppler signal and wherein the micro-Doppler signature is determined in response to the micro-Doppler signal.

6. The method of claim 1 wherein the trailer characteristic is indicative of a handling characteristic of a towed trailer.

7. The method of claim 1 wherein the reflected electromagnetic pulse comprises a frequency indicative of a radial velocity and wherein the data signal is generated in response to the radial velocity having a zero magnitude.

8. An apparatus comprising:
a transceiver for transmitting an electromagnetic pulse and for receiving a reflection of the electromagnetic pulse;
a filter for extracting a micro-Doppler characteristic from the reflection of the electromagnetic pulse;
a memory for storing a trailer characteristic;
a processor for comparing the micro-Doppler characteristic to the trailer characteristic, the processor being further operative to generate a control signal in response to the micro-Doppler characteristic corresponding to the trailer characteristic; and
a controller for controlling a vehicle in response to the control signal.

9. The apparatus of claim 8 further comprising a trailer sensor for determining the presence of a trailer and wherein the processor is operative to perform the comparison in response to the presence of the trailer.

10. The apparatus of claim 8 wherein the trailer characteristic is indicative of a trailer size and weight.

11. The apparatus of claim 8 wherein the transceiver comprises a first transmitter, a second transmitter and a first receiver.

12. The apparatus of claim 8 wherein the vehicle is an autonomous vehicle.

13. The apparatus of claim 8 wherein the reflection of the electromagnetic pulse comprises a frequency indicative of a radial velocity and wherein the micro-Doppler characteristic is extracted from the reflection of the electromagnetic pulse in response to the radial velocity having a zero magnitude.

14. A method of controlling a vehicle comprising:
transmitting a radar pulse;
receiving a reflection of the radar pulse;
filtering the reflection of the radar pulse in response to a frequency of the radar pulse to extract a micro-Doppler signal;
determining a micro-Doppler characteristic in response to the micro-Doppler signal;
determining a trailer type in response to the micro-Doppler characteristic and a stored trailer characteristic; and
generating a control signal for input to a vehicle control system in response to the trailer type.

15. The method of claim 14 further comprising receiving a data signal indicating the presence of a trailer.

16. The method of claim 14 wherein the reflection of the electromagnetic pulse comprises a frequency indicative of a radial velocity and wherein a data signal indicative of a trailer is generated in response to the radial velocity having a zero magnitude.

17. The method of claim 14 wherein vehicle is an autonomous vehicle.

18. The method of claim 14 wherein trailer type is indicative of a trailer size and weight.

19. The method of claim 14 further comprising generating a trailer control signal to engage a trailer brake in response to the trailer type.

* * * * *